Patented Oct. 21, 1947

2,429,209

UNITED STATES PATENT OFFICE 2,429,209

MANUFACTURE OF IRON HYDRATE

Perry Ellsworth Mayer, Audubon, N. J., assignor to The Sherwin-Williams Company, Cleveland, Ohio, a company of Ohio No Drawing. Application March 28, 1944, Serial No. 528,455

9 Claims. (Cl. 23—200)

In application Serial No. 387,874 of Seldon P. Todd and Fredric C. Verduin, which has now become Patent No. 2,403,248, there is disclosed and claimed a process of preparing iron hydrate from iron ammonium fluoride, which may be used in various industries, and which possesses marked superiority over commercially available materials for purifying illuminating gases and analogous fuel gases by the removal of hydrogen sulfide.

In that process a slurry of iron ammonium fluoride is oxidized and thereafter treated with ammonia to form hydrated ferric oxide and ammonium fluoride. In practice the oxidized slurry containing about 40% of previously washed iron ammonium fluoride, is run into aqueous ammonia or an ammoniacal ammonium fluoride solution to effect the following reaction:

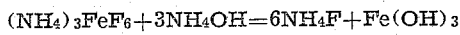
$(NH_4)_3FeF_6 + 3NH_4OH = 6NH_4F + Fe(OH)_3$

As the iron ammonium fluoride has a solubility in the neighborhood of about 2 to 3% at a temperature of 50° C., a considerable amount of soluble iron is present in the slurry, and this produces a finely divided colloidal iron hydrate by the action of the ammonia, and the presence of such colloidal iron hydrate renders the solids difficult to settle or to filter.

I have discovered a procedure whereby an iron hydrate may be made from iron ammonium fluoride which will settle and filter far more rapidly and has a much higher activity in the absorption of hydrogen sulfide from gases. This higher activity is surprising, because the particle size obtained in following my improved procedure is larger than when prepared by the Todd & Verduin procedure, and therefore has correspondingly less apparent surface to volume ratio. The reason for the higher activity is not understood, but it may be due to a fine pore structure, although such porosity is not detectable by ordinary microscopic examination, and the higher activity may be due to other unknown characteristics of the product.

In my improved method a slurry of iron ammonium fluoride may be prepared by the same reaction and oxidation as is employed in the Todd & Verduin method above referred to and which is obtained by digestion of ilmenite ore with ammonium fluoride solution and the removal of soluble titanium salts. Instead of adding the slurry to the aqueous ammonia, the slurry is permitted or caused to settle to form a mud containing at least 60% solids, and this mud is added to the aqueous ammonia with vigorous agitation.

The following is merely one example of a procedure which may be employed in forming the iron ammonium fluoride mud:

After the digestion of the ilmenite ore with ammonium fluoride solution, the iron ammonium fluoride consists of a mixture of ferric and ferrous, but mostly ferric salts. This mixture is separated from the titanium ammonium fluoride in a single compartment or unit thickener. The titanium salts are in solution in the hot liquor and overflow the thickener launder, while the iron salts underflow at between 60 and 70% solids. This iron ammonium fluoride is repulped with water and fed to a tray thickener having four trays. A slow speed rake or plow in each tray is employed to concentrate the settled material and to plow it to the center, where it drops into the next lower tray. Washing of this mud is accomplished by a wash pipe arrangement whereby fresh water enters the last or bottom tray first, is mixed with the mud as the latter drops into this tray from the third tray, and after separation from the solids it is moved from the top of the bottom tray through a wash box and into the third tray to repeat the process, etc. The washing process is carried out for the purpose of removing soluble titanium salts and ammonium fluoride entrained with the iron ammonium fluoride mud. Various other procedures may be employed for carrying out this washing process.

The iron ammonium fluoride mud delivered from the washing apparatus contains about 50 to 60% solids, and the titanium (calculated as $TiO_2$) reduced to one part in four or five parts of iron (calculated as $Fe_2O_3$). A part of the titanium compound cannot be washed out, due to its insolubility in water. The washed iron ammonium fluoride is diluted to about 30 to 40% solids with fresh water, and is then oxidized in turbo mixer oxidizers. These may be of 1000 gallon capacity, and beat air into the slurry to oxidize the remaining ferrous ammonium fluoride (about 20% of the total) in two or three hours, and to obtain 98 to 99% oxidation. The specific gravity of this slurry ranges from 1.20 to 1.35.

In carrying out my improved process this slurry instead of being delivered to the aqueous ammonia is pumped to batch settling tanks having stirring and agitating mechanism. After thorough agitation the stirrers are stopped and the solids permitted to settle for from one to two hours, depending upon the speed of setting. The supernatant liquid containing soluble iron salts is decanted and may be used as the first reslurry water for the thickener underflow above referred to, or may be otherwise treated for the recovery of such valuable ingredients as it may contain.

The settled or concentrated mud is the material which in my process is added to the aqueous ammonia instead of adding the slurry as in the Todd & Verduin method. This concentrated mud is added to a tank containing a solution of ammonium fluoride and ammonium hydroxide, the volume ratio being approximately ten of the solution to one of the thickened mud of iron ammonium fluoride containing about 70% solids. The concentration of ammonium hydroxide (calculated as free ammonia) in the liquid is built up to approximately 8% free ammonia solution, by the addition of stronger aqua ammonia, if the free ammonia content is less than about 8%. This gives a mol ratio of about 3.34 mols of total ammonia to the fluorine in the iron ammonium fluoride.

The batch is stirred for at least two hours with additional agitation, which may be effected by pumping liquid from the bottom of the tank back into the top for at least the first half hour of the conversion period. The slurry is then ready for separation of the iron hydrate produced by the reaction from the ammonium fluoride and excess ammonium hydroxide. The separation may be effected in any suitable type of apparatus and the separated iron hydrate may be washed and then filtered to produce a cake containing about 60% water. The cake upon being dried contains from 70 to 75% $Fe_2O_3$.

The mud may be completely dried and added to the ammonia solution in powdered form, or other iron compounds may be used which will react with an ammonia solution to form a ferric hydrate. The mud or dried iron compound may be dumped in the ammonia solution, in which case thorough agitation is necessary, or it may be added gradually, in which case less agitation is needed.

By means of my improved procedure, which broadly considered, involves the addition of an insoluble iron compound which may contain not to exceed 40% of water, to the ammonia solution, the resulting iron hydrate may be easily and quickly filtered, in contrast to the product obtained when a slurry containing 40% solids is added to the ammonia solution. The filterability of the iron hydrate produced by my improved method may be readily determined by testing with a laboratory leaf filter with a vacuum of 20 inches of mercury. In one minute a layer of iron hydrate will be picked up, of less than one-eighth inch thickness when made according to the method disclosed by Todd & Verduin, whereas by following my improved method it is easy to obtain a layer of iron hydrate one-quarter inch thick in an equal length of time, and under similar conditions. By increasing the percentage of solids in the iron ammonium fluoride cake a thickness of three-quarters inch and more can be obtained.

My improved method not only results in a more easily and more rapidly filterable product, but it also has very much greater activity in the absorption of hydrogen sulfide.

To determine the activity of the iron hydrate produced by my improved method, and as compared to that produced from an iron ammonium fluoride slurry and iron salts in solution, a series of tests have been made. These tests involve the preparation of a charge in the form of a sponge, and composed of 56 grams of sawdust of −20+40 mesh, 40 grams of dry iron hydrate, and 64.4 grams of water. The sawdust and dry iron hydrate were thoroughly mixed, the correct amount of water added, and the mixture stirred with a spatula and then a pestle until there was an even distribution of the iron compound on the sawdust. The charge of the sponge was placed in a Pyrex glass tube 20 inches long and having an I. D. of 1⅜ inches. The bottom layer consisted of a spacing cork and ¼ inch of cotton. After placing the sponge within the tube another layer of cotton was placed on top, and the cotton plug pushed down with light pressure.

A mixture of gas containing 3,000 grams of $H_2S$ per 100 cubic feet was passed through the tube at the rate of 5 cubic feet per hour. At the outlet end of the tube there was placed a strip of filter paper moistened with basic lead acetate. The first stain obtained on this filter paper indicated the completion of the test. The time in minutes to obtain the first stain, multiplied by 3.2, gave the activity number of the iron hydrate sponge being tested. The results of this test are shown in the following table:

| Sample | 1<br>Weight Slurry, lbs. | 2<br>Per Cent Solids | 3<br>Wt. Added 8% Aqua Ammonia, lbs. | 4<br>Activity |
|---|---|---|---|---|
| A | 4.2 | Soluble | 7.9 | 155 |
| B | 2.1 | 40 | 11.2 | 310 |
| C | 1.4 | 60 | 11.2 | 517 |
| D | 1.1 | 77 | 11.2 | 462 |

In sample A a solution of ferric ammonium sulfate was used in making the cake. In samples B, C and D the solid used in making the cake was ferric ammonium fluoride. There was an appreciable quantity of titanium hydrate present as an impurity in samples B, C and D. In each case the amount of ammonia added was 3.6 pounds of $NH_3$ to each pound of $Fe_2O_3$ produced.

It will be noted that the activity obtained from the use of soluble ammonium sulfate was 155, the activity of a sample made by the use of a slurry containing 40% solids was 310, and that the activity of the iron hydrate made by using a mud containing 60% solids was 517. Where the mud contained 77% solids the activity was 462. Thus it will be seen that very substantial increase in activity is obtained by using the mud containing 60% or more of solids as against using a slurry containing 40% solids.

Samples of the same materials were tested to determine the relative settling and filtration rates. The data obtained are shown in the following table:

| Sample | 1<br>Weight Slurry, lbs. | 2<br>Per cent solids | 3<br>Wt. Added 8% Aqua ammonia, lbs. | 4<br>Time in sec. for converted sl. to settle to half original volume | 5 Filtration | | 6 Wet Cake | 7 |
|---|---|---|---|---|---|---|---|---|
| | | | | | Time, min. | Cake Thick, in. | Per cent $Fe_2O_3$ | Per cent Moisture |
| A | 4.2 | Soluble | 7.9 | 8,234 | 3 | 3/16 | 13.4 | 86 |
| B | 2.1 | 40 | 11.2 | 895 | 3 | 3/16 | 25.4 | 61 |
| C | 1.4 | 60 | 11.2 | 171 | 1 | 7/16 | 22.6 | 64 |
| D | 1.1 | 77 | 11.2 | 135 | ½ | 9/16 | 24.7 | 61 |

It will be noted that where a soluble ferric ammonium sulfate was used the time for settling was substantially ten times that required where a slurry containing 40% solids was used, and that when a mud containing 60 to 77% solids was used the time for settling was less than one-fifth the time required where a slurry containing 40% solids was used. It will also be noted that the time for filtration was very greatly reduced and the thickness of the cake was greatly increased.

For the filtration tests the iron hydrate was made into a slurry containing 6¼% of $Fe_2O_3$, and the filtration was effected on a leaf filter with 15 inches of vacuum.

An iron hydrate prepared by the improved method above described can be readily separated as a filter cake by the use of a rotary filter, or may be rapidly settled and may be sold as a moist cake. The purchaser may reslurry such product, and the iron hydrate will again rapidly settle or can be readily filtered.

Having thus described my invention, what I claim as new and desire to secure by Letters Patent is:

1. The method of preparing a hydrated iron oxide, which includes adding oxidized iron ammonium fluoride containing not over 40% of water to aqueous ammonia.

2. The method of preparing a hydrated iron oxide, which includes forming oxidized iron ammonium fluoride containing not over 40% of water, adding the same to aqueous ammonia, agitating, separating the iron hydrate, and washing.

3. The method of preparing a hydrated iron oxide which will readily settle or filter, and which has a high activity for the absorption of hydrogen sulfide, which includes forming a slurry of iron ammonium fluoride, oxidizing the material in the slurry, separating liquid from the slurry to such an extent that the material contains not over 40% of water, and treating the solids with aqueous ammonia.

4. The method of preparing a hydrated iron oxide which may readily settle or filter, and which has a high activity for the absorption of hydrogen sulfide, which includes forming a slurry of iron ammonium fluoride, oxidizing the material in the slurry, separating from the slurry a mud, washing the mud to remove substantially all of the ingredients other than iron ammonium fluoride, removing water to leave not to exceed 40%, and adding said iron ammonium fluoride to aqueous ammonia, agitating, separating the resulting hydrated iron oxide, and washing.

5. The method of preparing a hydrated iron oxide which may readily settle or filter, and which has a high activity for the absorption of hydrogen sulfide, which includes forming a slurry of iron ammonium fluoride, oxidizing the material in the slurry, separating from the slurry a mud containing at least 60% of iron ammonium fluoride, adding said mud to a solution of ammonium fluoride containing an excess of ammonia, agitating, separating the resulting hydrated iron oxide, and washing.

6. An iron hydrate having high activity in the absorption of hydrogen sulfide, and produced by the method defined in claim 3.

7. An iron hydrate prepared by the process of claim 5.

8. A relatively coarse iron hydrate produced by the process of claim 1 and having an activity for the absorption of hydrogen sulphide, at least 50% greater than that of an iron hydrate made by treating iron ammonium-fluoride slurry containing at least 60% of water with aqua ammonia.

9. A relatively coarse iron hydrate produced by the process of claim 1 and having an activity for the absorption of hydrogen sulphide, at least 50% greater than, and a settling rate at least twice as great as, that of an iron hydrate made by treating iron ammonium-fluoride slurry containing at least 60% of water with aqua ammonia.

PERRY ELLSWORTH MAYER.

REFERENCES CITED

The following references are of record in the file of this patent:

UNITED STATES PATENTS

| Number | Name | Date |
| --- | --- | --- |
| 2,167,784 | Svendsen | Aug. 1, 1939 |
| 2,042,435 | Svendsen | May 26, 1936 |
| 2,288,727 | Mayer | July 7, 1942 |
| 2,289,258 | French | July 7, 1942 |
| 2,365,202 | Marek | Dec. 19, 1944 |

FOREIGN PATENTS

| Number | Country | Date |
| --- | --- | --- |
| 566,890 | France | Nov. 28, 1923 |

OTHER REFERENCES

American Gas Practice, by J. J. Morgan, published by J. J. Morgan, Maplewood, New Jersey, 1931, pages 808-815.